Dec. 13, 1932.     J. J. TATUM     1,890,958
VEHICLE SPRING
Filed April 1, 1929     4 Sheets-Sheet 1
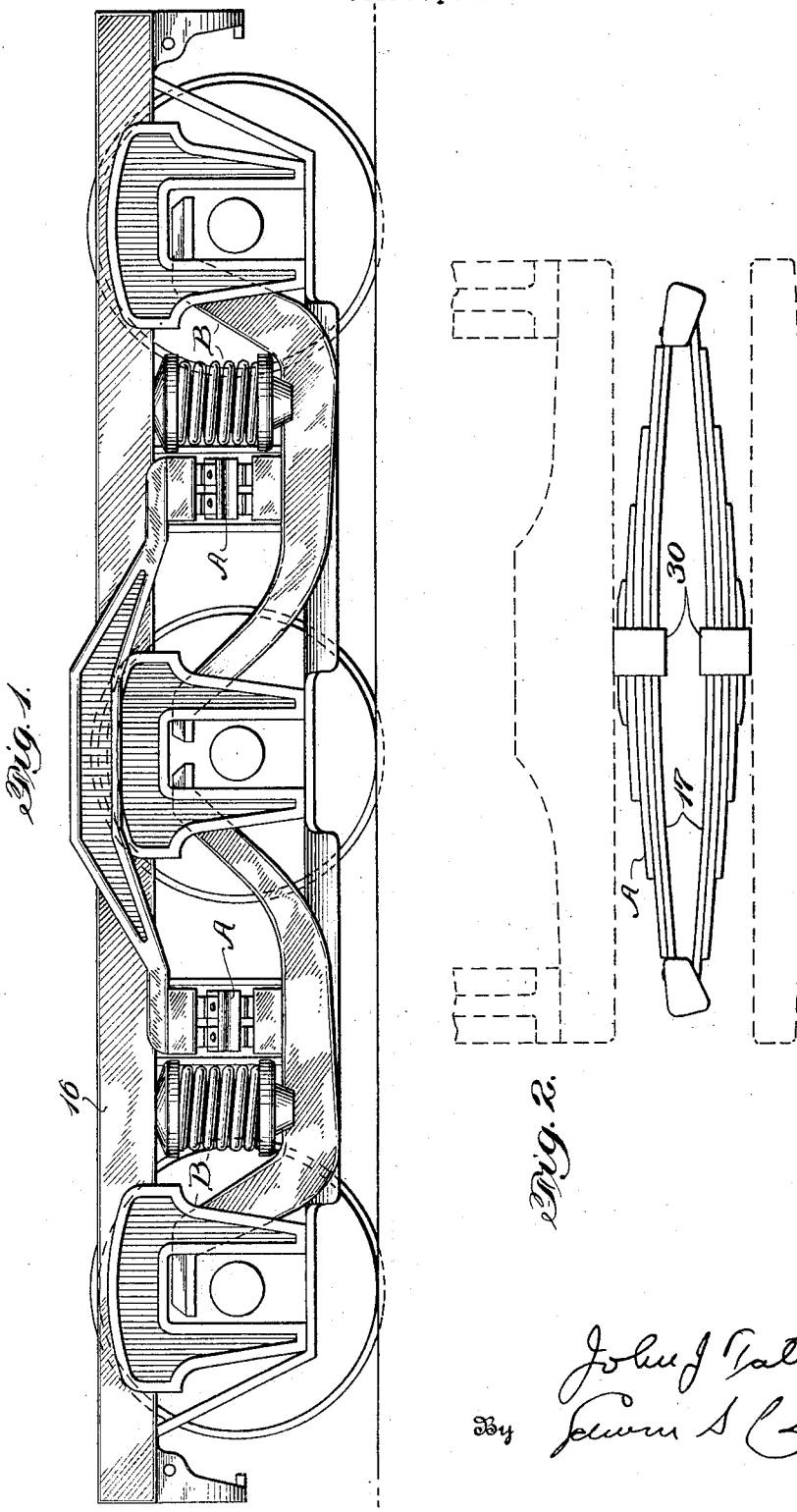
Inventor
John J Tatum
By [signature]
Attorney Dec. 13, 1932. J. J. TATUM 1,890,958
VEHICLE SPRING
Filed April 1, 1929 4 Sheets-Sheet 2
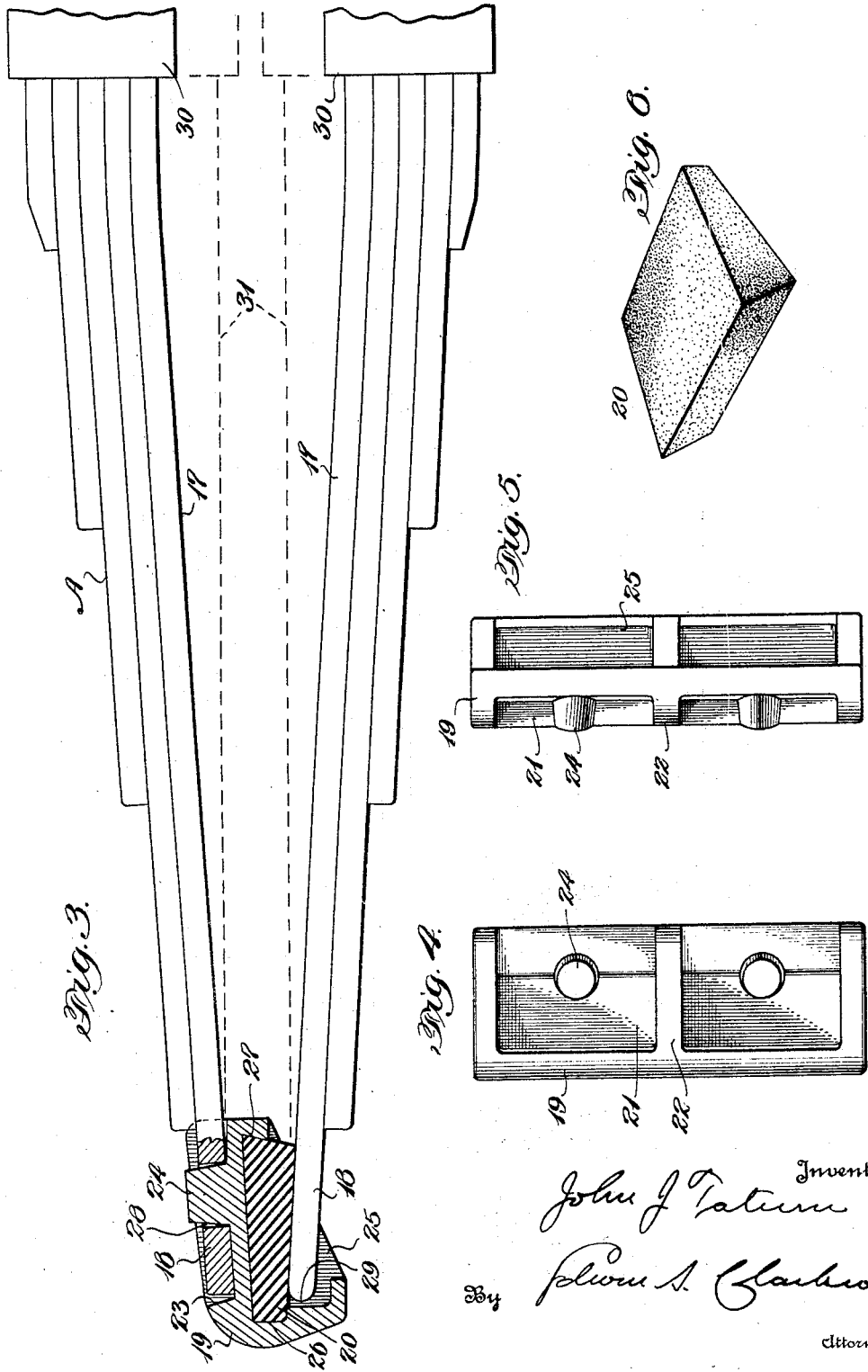

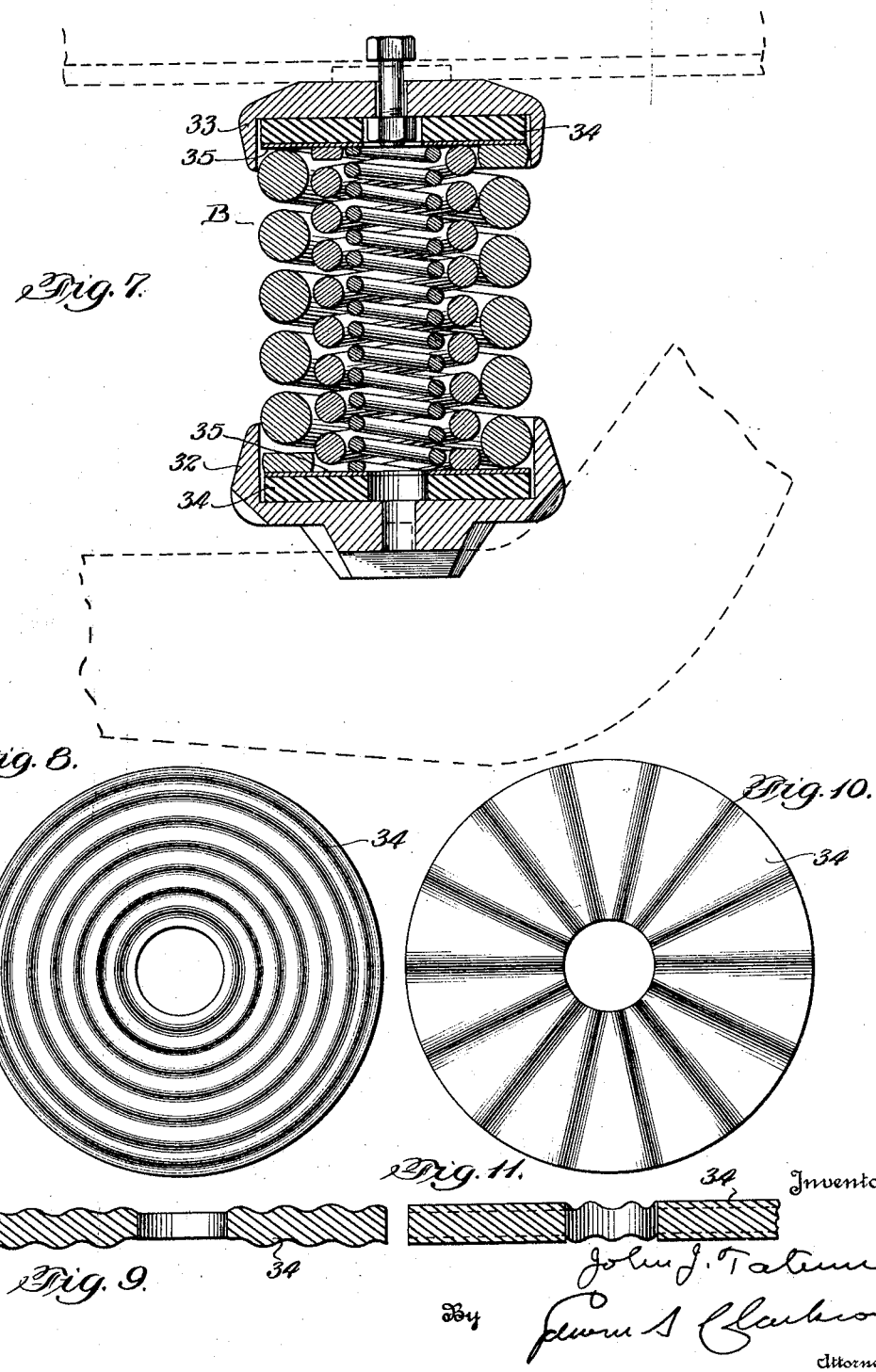

Dec. 13, 1932.   J. J. TATUM   1,890,958
VEHICLE SPRING
Filed April 1, 1929   4 Sheets-Sheet 4

Inventor
John J. Tatum
By [signature]
Attorney

Patented Dec. 13, 1932

1,890,958

UNITED STATES PATENT OFFICE

JOHN J. TATUM, OF BALTIMORE, MARYLAND

VEHICLE SPRING

Application filed April 1, 1929. Serial No. 351,803.

While I have for the purposes of illustration shown my improvements in springs associated with the truck of a railroad car, it will be understood that its use is not restricted to cars, but may be used on any vehicle.

Easy riding of railroad cars, and other vehicles, has been the problem of engineers for many years. Many methods have been resorted to, to provide cushioning means by which easy riding of vehicles might be accomplished.

For many years it has been the problem of metallic spring manufacturers to design metallic springs that will provide the desired soft riding of vehicles. This has been especially true in efforts to design metallic springs for railroad equipment. Springs of various designs and shapes have been made use of until now the elliptic spring, made of flat plates of various thicknesses and lengths is in general use, the most common design being known as an elliptic spring of one or more plates and one or more multiples of bundles or sections.

All-steel railway and other cars now commonly used are more rigid than the formerly used wooden cars, and these all-steel cars transmit the metallic sound of the wheels and parts of the running gear up into the car, which is annoying and obnoxious to the passengers, and it has come to the attention of the railroads that some passengers have been unable to continuously travel long distances because of the annoying sounds caused by vibration of the all-steel bodies and the rumbling of the wheels and rails.

The object of my invention is to provide a spring that will give what is now commonly known by automobile builders as balloon tire cushioning as well as an efficient sound deadening action; and with this and other objects in view my invention consists of the parts, and combination of parts hereinafter pointed out.

In the drawings:

Figure 1 is a side elevation of a car truck equipped with my improved springs.

Figure 2 is a side elevation of my improved elliptical spring, the dotted lines indicating associated parts of the truck.

Figure 3 is an enlarged view of one half of my improved elliptical spring, parts being in section.

Figure 4 is a top plan view of the spring end housing.

Figure 5 is an end elevation of the housing.

Figure 6 is a perspective view of the cushion insert.

Figure 7 is a vertical central section of my improved helical spring.

Figure 8 is a top plan view of a cushion insert having concentric corrugations.

Figure 9 is a central transverse section of Figure 8.

Figure 10 is a top plan view of a cushion insert having radial corrugations.

Figure 11 is a central transverse section of Figure 10.

Figure 12:
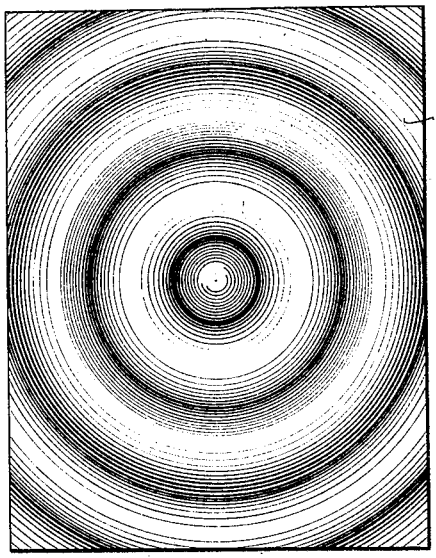
Figure 12 is an enlarged detail view of a portion of Figure 8.
Figure 14:
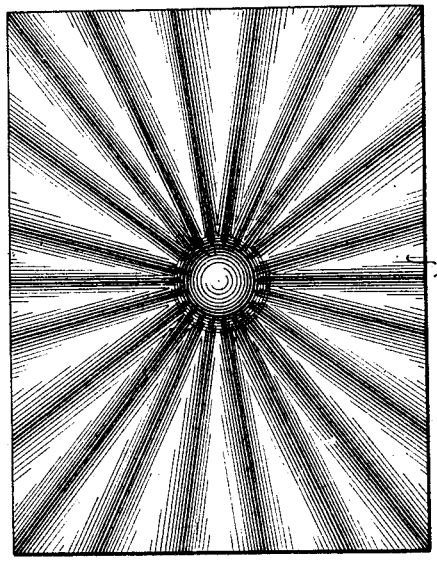
Figure 14 is an enlarged detail view of a portion of Figure 10.
Figure 13:
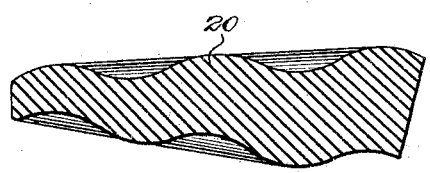
Figure 13 is a detail sectional view of Figure 12.
Figure 15:
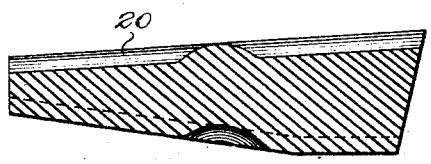
Figure 15 is a detail sectional view of Figure 14.

In the building of elliptical springs prior to my invention the main plates of the spring were continuous throughout the length of the spring and curled at their end portions and so arranged that these curled ends interlock with each other, and these curled ends provide an opening to receive an assembly bolt which locks the end of the main plate of the upper bundle to the main plate of the lower bundle. This construction provides the easiest riding spring for vehicles that engineers have been heretofore able to provide.

The reference number 16 designates a car truck of approved construction provided with my improved elliptical springs A and helical springs B.

My invention provides an elliptical spring somewhat similar to that now in general use, but without return interlocking ends on the extreme ends of the main plates 17. The main plates 17 in my improved spring are provided with free substantially straight ends 18 (see Figure 3) between which are inserted a metal frame 19 and a rubber insert or cushion 20. The frame 19 is shown in the drawings adapted to receive the ends of two elliptical springs, and it is obvious that it may be changed to receive a greater or less number of springs. This frame or housing 19 is provided with a recess 21 in its top face, two of such recesses being shown and separated by a partition 22; the end wall 23 of the recess 21 is inclined, as shown to accommodate the movement of the spring end and obviate binding. A stud, or lug, 24 is positioned in each recess. A recess 25 is formed in the under face of the housing and provided with a groove 26 at one end adapted to receive and retain one end of the cushion insert 20, and an undercut groove 27 adapted to receive and retain the other end of the cushion 20, as clearly shown in Figure 3; the main plate 17 of the upper spring is provided with an opening 28 adapted to receive the lug 24, while the main plate 17 of the lower spring is unperforated at its ends and has a free sliding bearing on the underface of the cushion 20; preferably, the end wall or edge 29 of the main plate 17 of the lower spring is ground to the radius shown.

In using my improved elliptical spring it is possible to space the extreme ends of the main plates 17 to any desired distance to accommodate any space desired between the center bands 30 when the spring is assembled, and this is made possible by having the ends of the main plates free from each other so that an independent insert can be placed between them of whatever thickness necessary to provide the desired space between the center bands 30 when the spring is under load.

The purpose of the cushion 20 is to add softness to the spring motion of the steel composing the spring, my object being to support the ends of the upper and lower main spring plates 17, so as to insure the spring, when assembled, riding under load, to be working approximately with its main plates 17 on a straight line (31, Figure 3) from end to end of the springs, the spacing of the ends of the main plates 17 making this possible. By this construction I provide maximum sensitive action, insure uniform softness in the cushioning, and provide balloon riding softness for the vehicle under which it is used.

In the helical spring assembly (Figure 7) I provide a spring seat 32 and cap 33 and position in the cap and seat a cushion 34 on which is mounted a metal plate 35 to prevent the helical spring from cutting into the rubber cushions 34. In this assembly the cushion 34 performs the functions described in connection with the cushion 20.

Preferably the cushion elements 20 and 34 are corrugated, the corrugations being either concentric, as shown in Figures 8 and 9, or radially, as shown in Figures 10 and 11. Other dispositions of the corrugations may be made, if desired.

The object and purpose of the corrugations in the cushioning members is to increase the cushioning effect of this cushion; these corrugations provide additional softness because a certain amount of air is present in the trough of the corrugations and the load first tends to straighten out the corrugations, the air cushion to assist in absorbing the shock, and when the corrugations are flattened out there is a material reduction in the shock by the time it is taken up by the body of the cushion.

Figure 16:
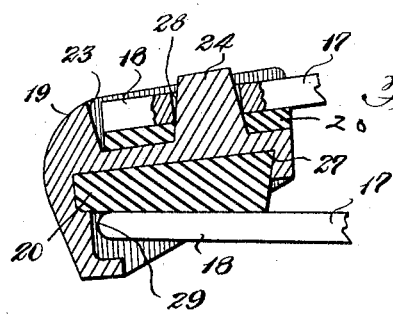
Figure 16 is a detail sectional view of a modification.

In Figure 16 I have shown another embodiment of my invention which consists in inserting a cushion 20 under the ends of the main plate of the upper spring bundle.

It will be seen from the foregoing that my invention not only provides means for cushioning the actions of the springs, so as to augment their cushioning actions, but which will at the same time dampen and prevent transmission of sounds to the vehicle body.

While I have described specific constructions for the purpose of disclosing my invention, it will, of course, be understood that I do not limit myself to the same, as other details of construction may be employed without departing from the inventive thought and the scope of the appended claims.

What I claim is:

1. An elliptical spring comprising an upper and a lower bundle each composed of a plurality of plates with free ends, a housing receiving and interlocked with the free end of the main plate of one of said bundles, and receiving the free end of the main plate of the other bundle and maintaining it in unattached spaced slidable relation to the end of the other main plate, whereby the spring when assembled, and riding in load, will be working approximately with its main plates on a straight line from end to end of the spring.

2. An elliptical spring composed of a plurality of plates including superposed main plates with free ends, a clip having sockets in its upper and lower faces receiving the said free ends of the main plates, the ends of one of the main plates being each slidably mounted in its socket, and a lug on the clip engaging the free end of the other main plate to hold the same against sliding movement in its socket while permitting limited pivotal movement of the same therein.

3. An elliptical spring comprising a plurality of plates having free ends, a housing receiving and slidably and pivotally coupling the ends of the main plates at each end of the spring, and a cushion in said housing interposed between the free ends of the main plates.

4. An elliptical spring comprising a plurality of plates with free ends, the main plates of the upper and lower bundles of the spring being unattached to each other, a housing in which the ends of the main plates at each end of the spring are inserted, the end of one of the main plates being held against independent sliding movement in the housing and the end of the other main plate being free to slide in the housing independently of the end of the first-named main plate, and a cushion in the housing between the ends of the main plate.

5. An elliptical spring comprising an upper and a lower bundle composed of a plurality of plates with free ends, a housing adapted to receive the ends of the main plates, the end of one main plate being interlocked to the housing and the end of the other main plate being slidable in the housing, and a cushion in the housing elastically holding the end of one main plate spaced from the housing and end of the other main plate.

6. An elliptical spring comprising an upper and a lower bundle composed of a plurality of plates including main plates with juxtaposed free ends, a housing adapted to receive the juxtaposed ends of the main plates, a cushion in the housing spacing the ends of the main plates apart, the end of one of the main plates being fixed against independent endwise movement to the housing and the end of the other main plate being free to move endwise relatively to the housing and in contact with said cushion.

7. In an elliptical spring, a housing having recesses for the ends of the main plates of the spring, a partition between said recesses, means carried by the partition to hold the end of one of the main plates against endwise movement relative to the housing, and a cushion carried by said housing and disposed between said partition and the end of the other main plate.

8. In an elliptical spring, a housing for the ends of the main plates of the spring bundles, a seat on the housing for the free end of one of the main plates, an interlocking connection between said spring end and the seat, and a cushion seat on the housing for the free end of the other main plate on which said plate end is slidably movable.

9. In an elliptical spring, a housing for the ends of the main plates of the spring bundle, a non-elastic seat on the housing for the free end of one of the main spring plates, and a cushion seat carried by the housing for the end of the other main spring plate.

10. In an elliptical spring, a housing for the ends of the main plates of the spring, a seat on the upper face of the housing, a lug extending upward from said seat, and a cushion seat within the housing beneath the first-named seat.

11. An elliptical spring embodying a pair of plates having free ends, a housing receiving and movably connecting the free ends of said plates, and a cushion carried by the housing and interposed between the ends of the plates.

12. In a cushioning spring for vehicles, an elliptical spring, abutments engaging the ends of the spring, and elastic cushioning elements between the respective spring ends and held in position by the abutments.

13. In a cushioning means for elliptical springs, the combination with spring plates of the upper and lower portions of the spring, of a clip slidably coupling the ends of the spring plates, and a cushion operably retained by the clip between the ends of the spring plates.

14. In a cushioning means for elliptical springs, the combination with spring plates of the upper and lower portions of the spring, of a clip slidably coupling the ends of the spring plates, and a cushioning element of rubber operably retained by the clip between the ends of the spring plates.

15. In a cushioning means for elliptical springs, the combination with spring plates of the upper and lower portions of the spring, of means engaging the ends of said plates and holding them connected in sliding relation, and a rubber cushioning member arranged to cushion the movements of said ends of the plates.

16. In a cushioned elliptical spring, the combination with spring plates of the upper and lower members of the spring, of a spring clip holding the ends of the spring plates in slidable engagement, and a sound deadening cushion retained by the clip, said clip having seats to accommodate said ends of the spring plates and to bring the sprung weight upon said cushion.

17. The combination with juxtaposed portions of a pair of spring plates of an elliptic spring, of means slidably and pivotally connecting said ends of the spring, and a vibration and sound damping cushion disposed between such ends of the spring plates.

18. The combination with juxtaposed portions of a pair of spring plates of an elliptic spring, of means slidably and pivotally connecting said ends of the spring, and a vibration and sound damping cushion comprising a body of rubber disposed between such ends of the spring plates.

19. A cushioned spring structure of the character set forth in claim 18 wherein the rubber cushion is corrugated.

20. The combination with juxtaposed end portions of a pair of spring plates of an elliptic spring, a coupling member having recesses in its opposite faces receiving said ends of the spring plates, the wall of one of the recesses and the spring end disposed therein being provided with interengaging portions, and a rubber cushion in the other recess cushioning the spring end disposed therein.

In testimony whereof I affix my signature.

JOHN J. TATUM.